United States Patent Office 2,834,550
Patented May 13, 1958

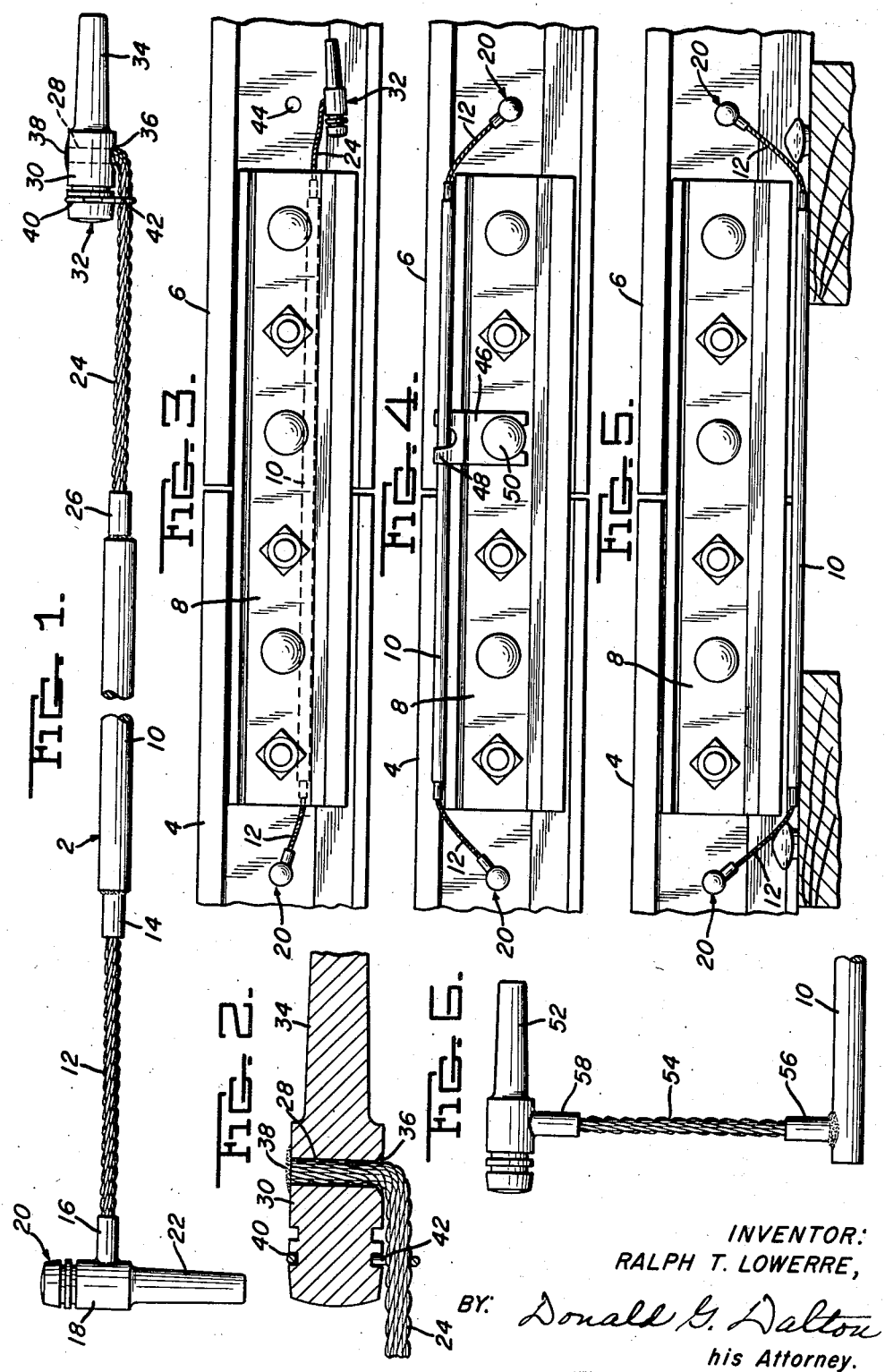

2,834,550

RAIL BOND OR ELECTRICAL CONNECTOR

Ralph T. Lowerre, Bedford, Ohio, assignor to United States Steel Corporation, a corporation of New Jersey Application May 16, 1955, Serial No. 508,669

4 Claims. (Cl. 238—14.9)

This invention relates to a rail bond or track circuit connector and more particularly to a rail bond which passes behind or above a splice bar connecting two rail ends. The type of rail bond usually used for this purpose consists of two terminal fittings at the end of a flexible stranded wire structure, which is required to resist the heavy vibrational stresses induced in the bond due to the passing of a train over the rail near the point of attachment of the bond to the rail. Abrasion and pinching of the fine wires in the stranded wire structure occurs behind the splice bar and, when the rail ends are built up by wedling, the fine wires are often damaged by the heat from the welding operation, especially when the gap between rail ends is open wider than usual. When the rail bond is used outside the splice bar damage to the stranded wire structure may result from material dropping thereon, careless track maintenance work, flying ballast, etc.

It is therefore an object of my invention to provide a rail bond which can easily be threaded behind the splice bar and which is not subject to the usual damages that take place when a stranded wire structure is used between the terminals, but at the same time preserve the proper flexibility at the point of attachment.

This and other objects will be more apparent after referring to the following specification and attached drawings, in which:

Figure 1 is a view of one form of a completed rail bond prior to installation;

Figure 2 is an enlarged sectional view through one terminal of the rail bond;

Figure 3 is a view of the rail bond fastened to the rails with the bond extending behind the splice bar;

Figure 4 is a view of the rail bond in place on top of the splice bar;

Figure 5 is a view of the rail bond in place with the bond resting on the ties; and Figure 6 is a fragmentary view showing one of the many possible modifications of the bond.

Referring more particularly to the drawings, reference numeral 2 indicates a rail bond of my invention which electrically connects the ends of rails 4 and 6. The rails 4 and 6 are connected by means of a splice bar 8 in the usual manner. The rail bond 2 has a central rod 10 which is made of electrical conducting material such as low carbon steel. A flexible stranded wire structure 12 of electrical conducting material has one end enclosed in a metal sleeve 14 and the other end enclosed in a similar sleeve 16. The sleeve 14 is butt welded to the rod 10 and the sleeve 16 is butt welded to head portion 18 of a standard terminal 20 which has a tapered shank portion 22 for insertion into a hole in the rail. A similar stranded wire structure 24 is provided with a sleeve 26 at one end which is welded to the other end of the rod 10. As best shown in Figure 2, the free end of the stranded wire structure 24 extends through an opening 28 in the head portion 30 of a terminal 32 which is provided with a shank portion 34 similar to the shank portion 22. The hole 28 has a counter sunk portion 36 and the stranded wire structure 24 extends through the hole 28 from the end having the counter sunk portion 36 to a position substantially flush with the end of the hole. The stranded wire structure 24 is attached to the head 30 by means of an arc weld 38. The head portion 30 is provided with a circumferential groove 40 for receiving a spring clip 42 which has a portion for receiving the stranded wire structure 24 as disclosed in my copending application, Serial No. 463,371, filed October 20, 1954.

In installing the bond as shown in Figure 3, the bond is arranged as shown in Figure 1 and the terminal 32 is threaded behind the splice bar 8 from the left hand end until it extends beyond the other end of the splice bar. It will be seen that the rod 10 is substantially as long as the splice bar 8. After the rail bond has been threaded between the splice bar and the web of the rail to the positions shown in Figure 3, the clip 42 is removed and the conductor 24 bent back to its original position in which its axis is perpendicular to the longitudinal axis of the terminal 32. The tapered shank of each fitting is then driven in the usual manner into a hole 44 provided in the web of each rail, thus fastening the terminals to the rail.

When fastening the bond on top of the splice bar a clip 46 having an outwardly bent portion 48 is supported by one of the splice bar bolts 50 and the rod 10 is held in position thereby as shown in Figure 4. In this embodiment both terminals may be constructed in the manner of terminal 20 since the terminal need not be threaded through a restricted space.

As shown in Figure 5, the rod 10 of the bond may merely rest on top of the ties, the rod being of sufficient strength that no substantial damage will result thereto.

In addition to being used in connections between rails connected by splice bars, the bond may be used to convey current between parallel rails and in other installations where long bonds are required and where the stranded wire structure is subject to danger from mechanical damage such as dragging equipment, flying ballast, careless track maintenance, etc.

Figure 6 shows one end of a modified rail bond or connector, as there shown a terminal 52 is fastened to the periphery of the rod 10 adjacent one end. In this embodiment a stranded wire structure 54 is provided with two sleeves 56 and 58 with the sleeve 56 being welded to the periphery of the rod 10 and the sleeve 58 being welded to the terminal 52. The terminal at the other end of rod 10 may be of the same type as either terminal 20 or 32 or any other desired arrangement may be used. For example, a second terminal 52 arranged as shown may be used when connecting adjacent or parallel rails. In other cases the free end of the stranded wire structure may be merely tinned for a short distance. In general any of the standard terminals may be used at the end of the stranded wire structure and the stranded wire structure may be fastened to the rod 10 by means other than welding.

While several embodiments of my invention have been shown and described it will be apparent that other adaptations and modifications may be made without departing from the scope of the following claims.

I claim:

1. A rail bond for connecting two rails at widely spaced points comprising a rigid metal rod of electrical conducting material, a flexible stranded wire end connector of electrical conducting material fastened to each end of said rod, the length of each connector being short in comparison to the length of said rod, and a terminal fitting secured to the free end of at least one of said stranded wire end connectors.

2. A rail bond for connecting two rails at widely spaced points comprising a rigid low carbon steel rod, two flexible stranded wire end connectors of electrical conducting material, one fastened to each end of said rod, the length of each connector being short in comparison to the length of said rod, and a terminal fitting secured to the free end of each of said stranded wire end connectors.

3. A rail bond for connecting two rails at widely spaced points comprising a rigid low carbon steel rod, two flexible stranded wire end connectors of electrical conducting material, a sleeve fastened to one end of each stranded wire end connector, the length of each connector being short in comparison to the length of said rod, one of said sleeves being welded to one end of said rod and the other of said sleeves being welded to the other end of said rod, a terminal fitting secured to the free end of one of said stranded wire end connectors, a sleeve fastened to the free end of the other stranded wire end connector and a terminal fitting welded to the last named sleeve, the diameter of said rod being greater than the diameter of said sleeves.

4. In combination, a pair of railroad rails, a splice bar connecting the rails and a rail bond electrically connecting said rails, said rail bond comprising a rigid metal rod of electrically conducting material, said rod having a length approximately the same as said splice bar, two flexible stranded wire end connectors one welded to each end of said rod, the length of each connector being short in comparison to the length of said rod, a terminal fitting secured to the free end of each of said stranded wire end connectors.

References Cited in the file of this patent

UNITED STATES PATENTS

| | | |
|---|---|---|
| 427,162 | Edwards | May 6, 1890 |
| 1,569,069 | Brown | Jan. 12, 1926 |
| 1,643,110 | Briggs | Sept. 20, 1927 |
| 1,850,915 | Bovard | Mar. 22, 1932 |
| 2,345,750 | Hohwart | Apr. 4, 1944 |
| 2,604,570 | Aversten | July 22, 1952 |

FOREIGN PATENTS

| | | |
|---|---|---|
| 487,886 | Canada | Nov. 11, 1952 |
| 449,618 | Germany | Sept. 19, 1927 |
| 18,583 of 1895 | Great Britain | Sept. 5, 1896 |